(No Model.) 5 Sheets—Sheet 1.

J. F. DURYEA.
MOTOR VEHICLE.

No. 585,159. Patented June 22, 1897.

Fig. 1.

Witnesses:
J. W. Garfield
H. I. Clemons

Inventor,
James Frank Duryea,
by Chapin & Co
Attorneys (No Model.) 5 Sheets—Sheet 4.

J. F. DURYEA.
MOTOR VEHICLE.

No. 585,159. Patented June 22, 1897.

Witnesses:
J. W. Garfield
H. I. Clemons

Inventor:
James Frank Duryea,
by Chapin & Co
Attorneys.

(No Model.) 5 Sheets—Sheet 5.

J. F. DURYEA.
MOTOR VEHICLE.

No. 585,159. Patented June 22, 1897.

Witnesses:
J. W. Garfield
H. J. Clemons

Inventor:
James Frank Duryea,
by Chapin & Co.
Attorneys.

UNITED STATES PATENT OFFICE.

JAMES FRANK DURYEA, OF SPRINGFIELD, MASSACHUSETTS, ASSIGNOR TO THE DURYEA MOTOR WAGON COMPANY, OF SAME PLACE.

MOTOR-VEHICLE.

SPECIFICATION forming part of Letters Patent No. 585,159, dated June 22, 1897.

Application filed November 7, 1896. Serial No. 611,370. (No model.)

*To all whom it may concern:*

Be it known that I, JAMES FRANK DURYEA, a citizen of the United States of America, residing at Springfield, in the county of Hampden and State of Massachusetts, have invented new and useful Improvements in Motor-Vehicles, of which the following is a specification.

This invention relates to motor-vehicles, and has for its object the improvement in the driving mechanism for automobile carriages, wagons, power-driven boats, and analogous purposes, means for controlling the speed of such vehicles, and means for steering them; and said invention consists in the construction and arrangement of the said various improvements, all as set forth in the following specification and claims.

The said improvements are herein shown as applied to a motor-carriage.

In the drawings forming part of this specification.

Referring to the drawings, the body A of the wagon or motor-carriage is supported on suitable springs on the axles B and B'.

B is the driving-axle, and B' the forward axle of the carriage. Both of said axles are rigidly secured to the frame of the carriage in positions parallel with each other.

Figure 1:
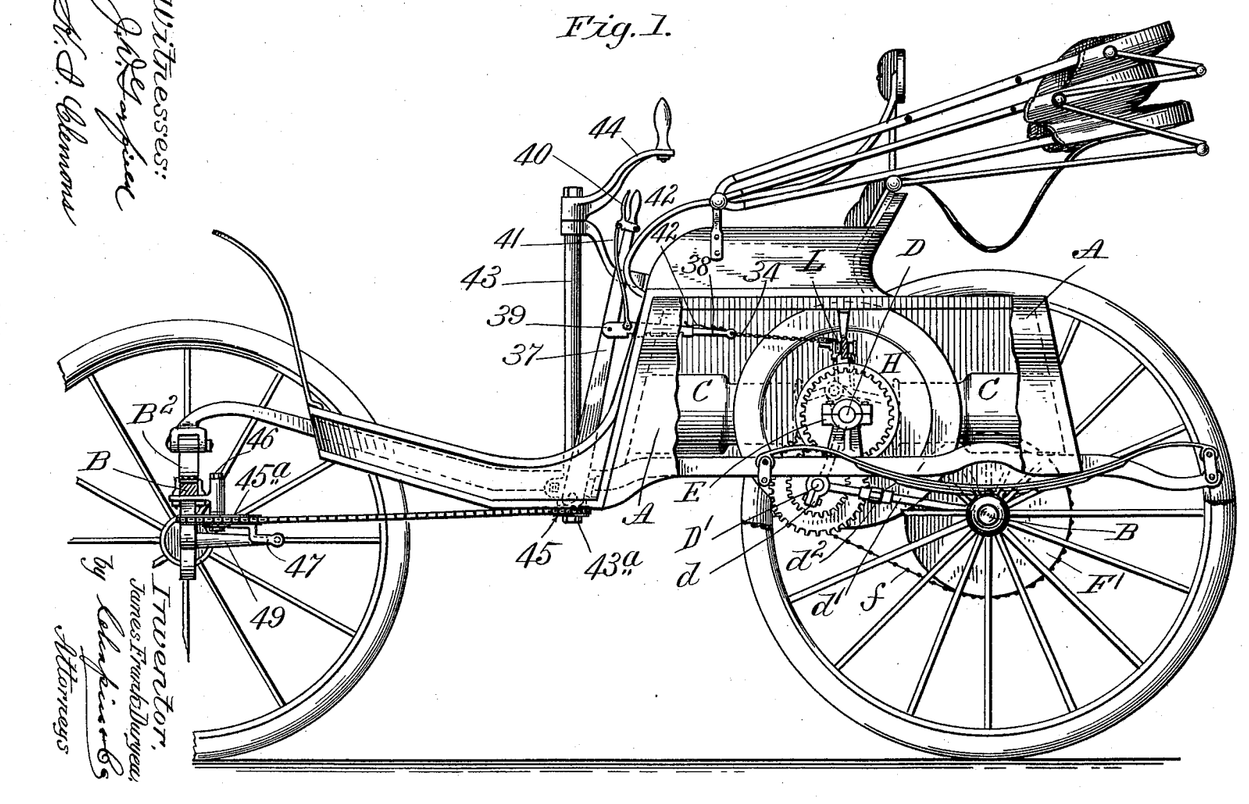
Figure 1 is a side elevation of a motor-carriage embodying my improvements, the parts of said carriage being in section and a part of the body thereof being shown as broken away.

On each end of the forward axle is hinged on a vertical bolt 50 a short stud for the reception of the hub of the wheel of said vehicle. Said stud has a swinging movement in a horizontal plane, which movement is imparted thereto as follows: A short horizontal arm 49 projects rearwardly from the said stud, which arm is by rods 48 connected to the forked lever 47, which is secured to a sprocket-wheel 45$^a$. (See Figs. 1 and 2.) Said sprocket-wheel is rotatably supported on a yoke 46, which is clamped to the forward axle B'. A sprocket-chain 47$^a$ engages said wheel 45$^a$ and a similar sprocket-wheel 45 on the lower end of the steering-post 43$^a$ within the tubular support 43. The upper end of said steering-post is provided with a crank-arm 44, whereby it is rotated, and through the connections above described the forward wheels of the vehicle are turned on their pivots 50.

Instead of the sprocket-chain 47$^a$ any other suitable flexible connection may be used in its place.

Suitably supported on the frame of the carriage and at right angles to the axles thereof is a suitable motor. Said motor is preferably a gasolene-motor, though any suitable motor may be used. In the drawings said motor is represented by C and shows two oppositely-located cylinders connected directly to a crank on the end of the driving-shaft D, (see Fig. 1,) which shaft is supported on suitable bearings E on the frame of the carriage and is parallel with the driving-axle B thereof. A counter-shaft D', parallel with shaft D, is supported in bearings at the extremities of the arms $d$, which arms depend from the main shaft D and have a swinging motion thereon. A rod $d'$, having a loose connection with each end of the counter-shaft and the rear axle, is made in two parts, said two parts being united by a suitably-threaded nut $d^2$, by which the distance between said counter-shaft and said driving-axle is regulated. On one end of said counter-shaft a sprocket-wheel F is secured, and on said driving-axle another sprocket-wheel F' is secured, a sprocket-chain $f$ engaging both of said wheels. The tension of said chain $f$ is regulated by means of said nut $d^2$ on the rods $d'$.

By means of suitable connections between the driving-shaft D and its counter-shaft D', to be described farther on, varying speeds are imparted to said counter-shaft and through said sprocket-wheels and chain to the driving-axle B.

Figure 7:
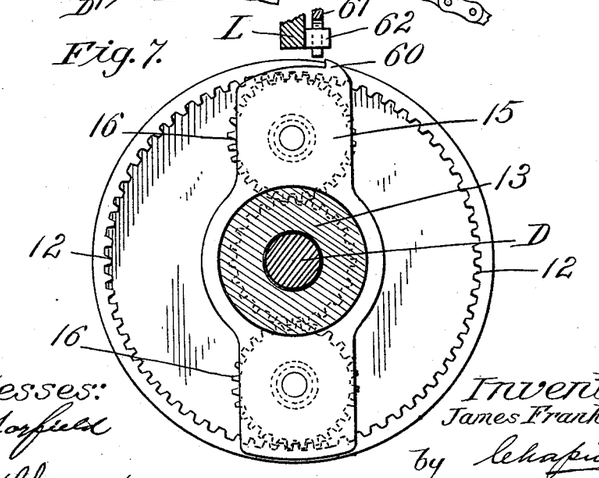
Fig. 7 is a section on line 7 7, Fig. 3, looking to the left.

The variable-speed driving mechanism located on the driving-shaft D is constructed as follows: On said shaft D are located three gears 5, 6, and 7, of varying diameters and rotatable freely thereon. Fixed to the counter-shaft D' and in mesh with said gears 5, 6, and 7 are three gears 2, 3, and 4, also of varying diameters. On one side of each of the gears 5, 6, and 7 are secured by screws or other suitable means the flanged friction-driven pulleys 8, 9, and 10, and on the side of the gear 7 opposite to the pulley 10 is secured the internally-geared flanged pulley 12. A face view of said pulley is shown in Fig. 7.

A friction-driven pulley 14 is located near the internally-geared pulley 12 on shaft D and turns freely thereon and is provided with a hub, on the face of which is cut the pinion 13, and between said pinion and the side of said pulley 14 a bearing is provided for the yoke 15, which carries on suitable studs $15^a$ two oppositely-located pinions 16, each of which is in mesh with said pinion 13 and the internally-toothed inner surface of the flange of the pulley 12.

Figure 6:
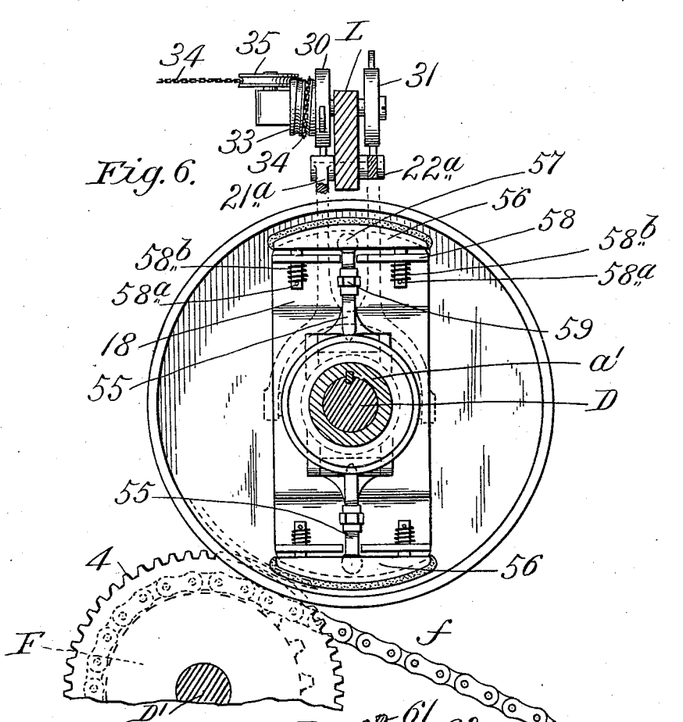
Fig. 6 is a section on line 6 6, Fig. 3, looking to the left.

Two hubs $a$ and $a'$ are located on the driving-shaft D between the pulleys 8 and 10 and are keyed to said shaft. Said hub $a$ is provided with the oppositely-located arms 17 and said hub $a'$ with the oppositely-located arms 18. A side view of said hub $a'$ and its arms is shown in Fig. 6. The pulleys 9 and 14 have located between them on said shaft D and keyed thereto the hubs $b$ and $b'$, provided, respectively, with the arms 19 and 20. The construction of these pulleys 8, 9, 10, and 14 is similar in all respects, as is also the construction of the friction-clutches whereby they are operated. Therefore a description of one will suffice. Referring, therefore, to the pulley 8, Fig. 3, there is located on the before-mentioned hub $a$ adjacent thereto a collar 21, on which hub it has a free sliding movement. Two oppositely-located lugs 51 on said collar have pivoted thereto one end of connecting-rods 55. Similar collars 22, 23, and 24 are provided on the hubs $a'$, $b$, and $b'$. The opposite ends of said connecting-rods engage with friction-shoes 56 by a ball-and-socket joint 57, as shown.

Figure 3:
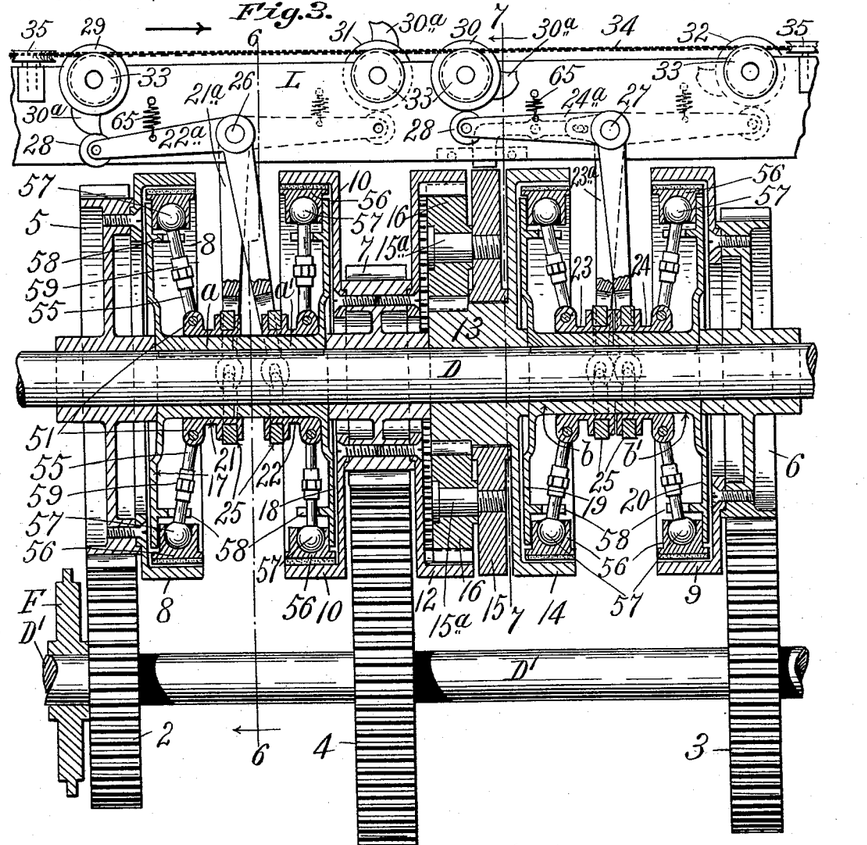
Fig. 3 is a view of a portion of the driving-shaft and its counter-shaft, showing the variable-speed driving mechanism on the driving-shaft in section and also showing speed-controlling devices for said driving mechanism.

On the arms 17 of hub $a$ are two lips 58, standing at right angles to said arms and located near their outer ends. Said lips are slotted, as shown in Figs. 3 and 6, to permit the passage therethrough of said connecting-rods 55. On each side of said slots two pins $58^a$, fixed in the under side of the shoe 56, project downwardly through said lips 58, and on that portion of said pins which project through said lips are located the springs $58^b$. Said springs are normally under tension and serve to restrain the shoes 56 from engaging the inner surface of the flange of the pulley 8 as shaft D is rapidly rotated, the said springs being of sufficient strength to overcome the centrifugal force exerted on said shoes 56 during their rotation. Said springs also serve the further purpose of retracting said shoes when the latter are to be disengaged by the operation of the clutch devices to be described farther on, and are assisted in effecting such disengagement by a spring 65 on the elbow-lever $21^a$. Said connecting-rods 55 are shown as being made in two parts, said parts being united by a suitably-threaded nut 59, whereby the proper adjustment of the shoes 56 against the inner surfaces of the flange of the pulley 8 is obtained. By the engagement of said connecting-rods 55 with the slotted lip 58 the said shoes 56 and the collar 21 are made to rotate with the hub $a$, on which said collar, as stated, has a longitudinal sliding movement. Said collar 21 is provided with an annular groove within which is a loosely-fitting ring 25, with which the forked arms of the elbow-lever $21^a$ engage, and which lever is pivotally hung at 26 to a bar L, centrally over the driving-shaft D.

Each one of the other pulleys 9, 10, and 14 is provided with a similarly-constructed clutch mechanism, each operated by an elbow-lever similar in construction to lever $21^a$. The elbow-levers $21^a$ and $22^a$ are both pivoted on the same pin at 26, on opposite sides of the bar L, with their horizontally-located arms pointing in opposite directions.

Elbow-levers $23^a$ and $24^a$ are, like levers $21^a$ and $22^a$, pivoted on the same pin at 27 and on opposite sides of the bar L.

Figure 2:
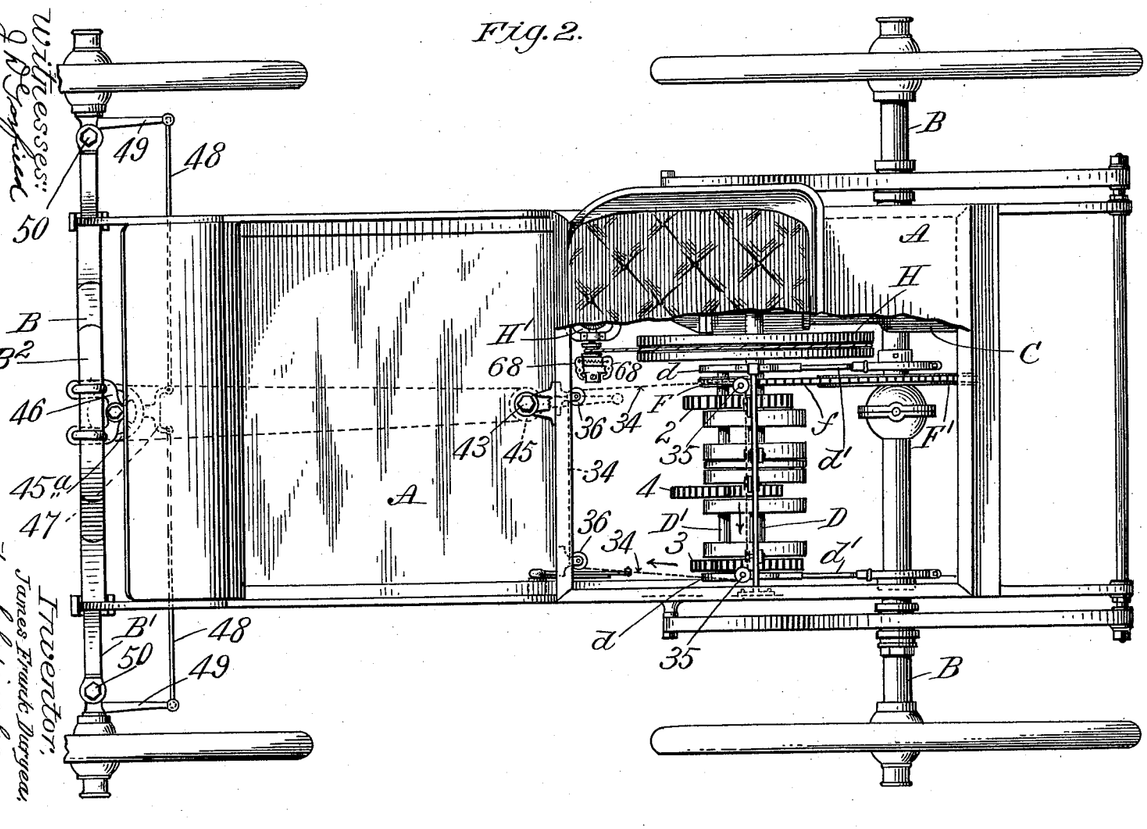
Fig. 2 is a plan view of a motor-carriage, part of the body being shown as broken away.
Figure 8:
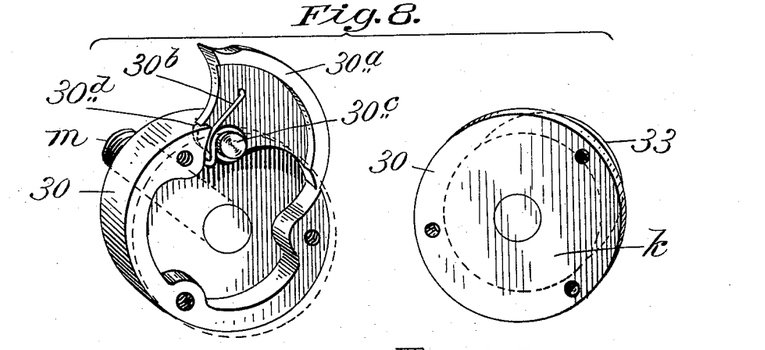
Fig. 8 is a perspective view of one of the folding cams of the speed-controlling mechanism and its cap.
Figure 9:
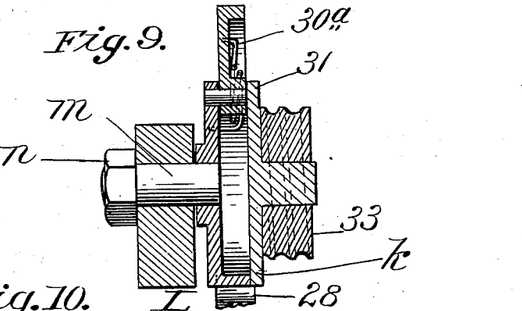
Fig. 9 is a vertical section through one of said cams.

The clutch mechanisms of the driving-pulleys 8, 9, and 10 are operated to drive the carriage forward at three different rates of speed. The clutch mechanism of the driving-pulley 14 is operated to drive the carriage backward. The means by which the said elbow-levers of the various clutch mechanisms are operated to drive the carriage forward or backward consist of a series of cams rotatably secured to the bar L, on opposite sides thereof, one of said cams being provided for operation on the end of each of the said elbow-levers, a cam-roll 28 being provided in the end of each of said levers. Each of said cams is provided with a spirally-grooved hub 33, around which a chain 34 is passed, which hubs are all in a line on one side of the bar L, and said chain being supported on sheaves 35, located on said bar L, and on sheaves 36, located on the frame of the carriage, whereby said chain is disposed in a horizontal quadrilateral form, all being clearly shown in Fig. 2. The said chain 34 is made endless and has secured to any convenient part thereof (but preferably to a part of said chain substantially at right angles to the driving-shaft, as shown in Fig. 2) a lever 38, which, by its opposite end, has a pivotal engagement with the operating-lever 37, whereby by the reciprocating movements of said operating-lever movement may be imparted to the said chain 34, by which movement the cams 29, 30, 31, and 32 may be rotated in either direction, because of the engagement of said chain 34 with the spirally-grooved hubs 33 of said cams, as above described. The construction of said cams and the relative position thereof on opposite sides of the bar L are shown clearly in Figs. 6, 8, and 9. Referring to Fig. 8, wherein is shown one of said cams 30 with its cap $k$ removed, (said cap being shown to the right of the view illustrating the cam proper,) it will be seen that the cam projection $30^a$ is designed to be folded back into the case of the cam. Said cam projection is pivoted for that purpose near the edge of the case at $30^c$, a suitable spring $30^b$ being provided, one end of which engages with the cam projection $30^a$ and the opposite end with the case for moving said cam projection out of its folded-in position and in position to engage the end of one of the elbow-levers, as described. A lip $30^d$ on said projection $30^a$ engages with the edge of the case and insures the return of said cam projection always to the same position by the operation of its spring. Said lip also serves as an abutment for said cam projection when the latter is in engagement with one end of one of said elbow-levers. In Fig. 9 is illustrated a sectional view of one of the said cams in position on the front of the bar L. In order to provide the necessary space for the retraction of the cam projection $30^a$ within the case, said case is fixed on the end of a stud $m$, one end of which is flush with the inner surface of said case. Said stud passes through the bar L, and a nut $n$ is applied to the suitably-threaded end of the stud projecting through said bar, said cam and stud rotating as one by the operation of the chain 34, passing around the hub 33, which hub is secured in any desirable manner to the cap $k$, the said cap being secured to the cam by screws or in any other convenient manner.

Figures 4, 5:
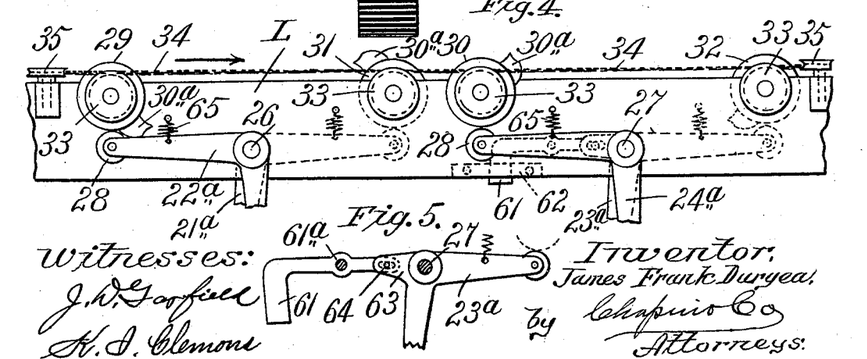
Fig. 4 shows a portion of the speed-controlling devices illustrated in Fig. 3 in the position the various parts would occupy when the carriage is stationary.
Fig. 5 is a detailed view of a part of the speed-controlling device, shown only in dotted lines in Figs. 3 and 4.
Figure 11:
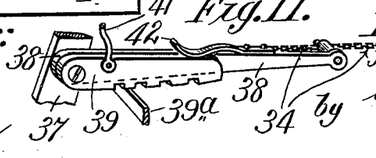
Fig. 11 shows the connection between the operating-lever and the speed-controlling devices illustrated in Figs. 3 and 4 and also shows means for holding said lever in any desired position.

By referring to Fig. 4 the position of the various elbow-levers and cams is shown in their relative positions when the carriage is stationary. With the parts in these positions the operator, by moving the operating-lever 37 so as to impart movement to the chain 34 in the direction of the arrow on said Fig. 4, will cause the rotation of all of the cams on the bar L and will cause the engagement of cam 29 with the end of the elbow-lever $22^a$, which will operate the clutch mechanism of the pulley 10 and start the carriage forward at its slowest rate of speed by causing the rotation of the gear 7, to which said pulley is secured, which is the smallest of the driving-gears and which is in mesh with the gear 4 on the counter-shaft and which is the largest of the driven gears. Said operating-lever 37 is pivoted by its lower end to the frame of the carriage in a position that will bring the handle end thereof convenient to the hand of the operator, and as said cam effects such engagement of the clutch mechanism of the pulley 10 a notched locking-lever 39, pivotally secured with lever 38 on the side of lever 37, (see Fig. 11,) is made to engage by the action of a spring 42 by one of its notches with a suitably-located bar $39^a$, lying at right angles thereto, and holds said cam in the position of engagement with said elbow-lever above described. Before said lever 37 can be moved to again change the speed of the carriage said lever 39 must be lifted to disengage its notched lower edge from said locking-bar $39^a$, which is effected by the operation of the elbow-lever 40 on the handle of the lever 37 and a connecting-rod 41 between said levers 40 and 39. If the chain 34 is then moved farther in the direction of the arrow on Fig. 4, the cam 29 passes out of engagement with the elbow-lever $22^a$ and the latter, by the springs 65 and $58^b$, disengages the clutch mechanism from the pulley 10. By the movement of the chain 34, which effects the engagement of the cam 29 and the elbow-lever $22^a$, the cam 30, which is the next to be engaged with its elbow-lever $24^a$, is brought from the position shown in Fig. 4 to that shown in Fig. 3, and each of the other cams on the bar L is rotated in like degree. By the continued movement of the chain in the direction of the arrow in Figs. 3 and 4 the next cam to engage one of the elbow-levers of the friction-clutches is cam 30 and after it the cam 31. When cam 31 has reached a position relative to the elbow-lever $21^a$ which the cam 29 occupies relative to the elbow-lever $22^a$ in Fig. 3, the operating-lever 37 will have reached its extreme forward limit of motion.

By the operation of the cams, as just described, it will be seen that to attain the highest speed the approach thereto is through two lower speeds, said highest speed being attained when said cam 31 (which is the last to engage its elbow-lever) has caused said lever $22^a$ to operate the friction-clutches in pulley 8, whereby motion is imparted through the gear 5 to the gear 2 on the counter-shaft, which counter-shaft is, as has been said, connected by a sprocket-chain with the driving-axle of the vehicle. A reverse motion of the operating-lever 37 from its extreme forward position causes the cam 31 to slide off of its elbow-lever $21^a$; but the cams 30 and 29, having passed beyond the end of said levers, when they are rotated backward by the movement just described of the operating-lever, encounter the ends of said elbow-levers $22^a$ and $24^a$, and the cam projections 30ª, as stated, fold back into their cases and are thus carried by the ends of their respective elbow-levers, when they are again thrown out of said cases by their springs into operative positions relative to the ends of said elbow-levers. As cam 32 never passes by the end of its elbow-lever 23ª said cam may be made without provision for folding it back into its case. When said operating-lever 37 has been moved back again to such position as will leave all of the cams on the bar L in the position shown in Fig. 4, a still further movement backward causes the cam 32 to engage with the elbow-lever 23ª, thereby throwing into operation the clutch devices of the pulley 14, whereby the carriage is made to run backward.

The construction of the devices for causing the rotation of the counter-shaft D' in a direction contrary to the motion imparted thereto by the other clutch devices on the shaft D is as follows: When the elbow-lever 23ª is operated by the cam 32, causing the clutch devices within the pulley 14 to engage the flange of said pulley and impart rotary motion thereto and to the parts receiving motion from said pulley 14, another lever is operated by the movement of elbow-lever 23ª. The lever referred to is 61 and is illustrated in Fig. 5 and shown in dotted lines in Fig. 3 and partially in Fig. 7. This lever is pivoted at 61ª to the bar L. The shorter end of said lever engages a short arm 63 of the elbow-lever 23ª. A pin 64 in the end of the short arm 63 passes through the slotted end of lever 61, whereby the movements of the elbow-lever 23ª are imparted to the lever 61, giving to the downturned end of the latter a vertically-reciprocating motion, a downward motion when the said elbow-lever is moved to effect the engagement of the clutch devices with the pulley 14, and an upward movement upon the disengagement of said devices.

As has been stated, the yoke 15 has a bearing on the hub of pulley 14, which yoke carries oppositely-located pinions 16, engaging with the pinions 13, cut in the hub of said pulley 14, and which also engage with the internally-toothed flange of the pulley 12, which is secured to the side of the driving-gear 7.

It will be observed from the construction above described that as soon as the clutch devices start the rotation of the pulley 14 the yoke 15 and its pinions move also, but by the simultaneous movement of the lever 61 downward said yoke 15 is stopped in its rotation by a tooth 60 on said yoke (see Fig. 7) coming into engagement with the end of said lever 61. By arresting the rotary movement of the yoke 15 and the continued rotation of the pulley 14 the gear 13, cut in its hub, immediately imparts rotary motion to the pinions 16 on their studs, and by the meshing of said pinions 16 with the internally-toothed flange of the pulley 12 the latter is given a rotary motion in a direction contrary to the rotation of the driving-shaft D, which movement is communicated to the counter-shaft D' through the gears 7 and 4.

By the movement of the operating-lever 37 in a proper direction the disengagement of the cam 32 with the end of the elbow-lever 23ª is effected, and the springs 65 and 58ᵇ act to unclutch the pulley 14, and the various cams will then be in the position shown in Fig. 4. Thus it is seen that the highest speed of the carriage must be attained step by step, while a return to its lowest speed is made by one continuous sweep of the operating-lever, and by a continued movement of said lever the carriage is started in an opposite direction.

The motor shown in the carriage forming the subject of this application is adapted to the use of volatilized gasolene as a source of power, the charges of the said gas being ignited by means of the breaking of an electric current generated by a small dynamo H', which is driven by a belt running over the balance-wheel H of the motor and the pulley 66 on the armature-shaft 67. It frequently happens that there are wide variations in the speed of the motor, and in going up a steep hill, for instance, or over a bad road the speed of the dynamo driven direct from the motor might be insufficient to produce a current of sufficient strength to insure positive ignition of the gasolene vapor in the cylinders of the motor.

If the speed of the armature was designed to be sufficient to produce positive sparking with the motor running at a low rate of speed, it would run much too rapidly when the carriage was running on a smooth level road. By means of the frictional mechanism for the armature-shaft (shown in Fig. 10 of the drawings) these inconveniences are done away with and the armature is made to run at a substantially uniform speed.

Figure 10:
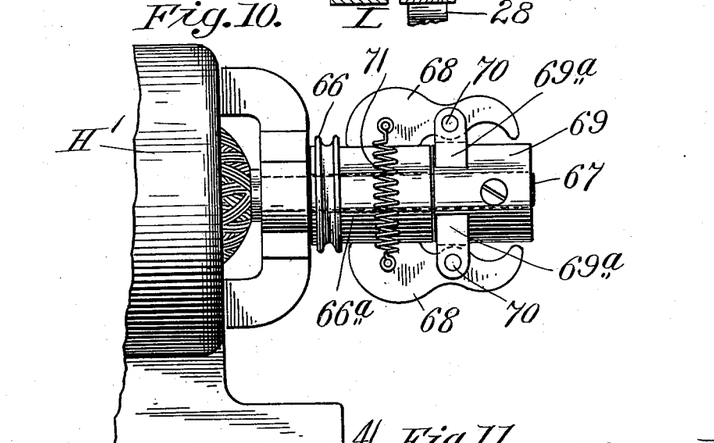
Fig. 10 is a view of one end of the armature-shaft of a dynamo, showing the frictional driving mechanism for said shaft.

The driving-pulley 66 of the armature is made of such size relative to the diameter of the balance-wheel of the motor from which it is driven, as described, that the minimum speed of said motor will be sufficient to produce an electric current of sufficient strength to insure a proper ignition of the charges of volatile gas in the cylinders of the motor. Said pulley 66, having the long hub 66ª, is not secured to the armature-shaft 67, but a hub 69 on the end of said armature-shaft is secured thereto by a set-screw or any other suitable means. On said hub 69 are two lugs oppositely located and having pivoted therein by the pins 70 the arms 68. Said arms are oppositely located on said hub 69 and their inner opposite faces are made slightly concaved to fit the surface of the hub 66ª. Said two arms 68 are united by a spiral spring 71, as shown. The strength of said spring 71 is such that when the speed of the armature-shaft is at its minimum point the frictional contact between said arms and the hub 66ª is sufficient to rotate said armature; but when the speed of the motor rises above a certain point centrifugal force generated by the rapid revolution of the armature operates to open more or less the said arms 68 and allow the pulley 66 and its hub to slip on the armature-shaft. As the speed of the armature decreases, the arms 68 are again caused to grip the hub of the pulley 66. By the use of these devices excessive speed of the dynamo is not possible and an average minimum speed is easily maintained.

Having thus described my invention, what I claim, and desire to secure by Letters Patent, is—

1. In a motor-carriage or other automobile conveyance, a motor, a driving-shaft connected with said motor, a driving-axle on said carriage, a counter-shaft parallel with said driving-shaft and said driving-axle, and movably supported by said shaft and said axle, a flexible driving connection engaging said counter-shaft and said driving-axle and a series of clutch mechanisms on said driving-shaft, gear connections between said clutch mechanisms and said counter-shaft for rotating the latter at varying speeds and in either direction, and means for operating said clutch mechanisms consisting of a series of rotating cams located in operative relation to the clutch-levers of said clutch mechanisms for operating the latter, and means for rotating said cams, substantially as described.

2. In a motor-carriage or other automobile conveyance, a motor, a driving-shaft connected with said motor, a driving-axle on said carriage, a counter-shaft parallel with said driving-shaft and said driving-axle, and movably supported by said shaft and said axle, a flexible driving connection engaging said counter-shaft and said driving-axle, and a series of clutch mechanisms on said driving-shaft, gear connections between said clutch mechanisms and said counter-shaft for rotating the latter at varying speeds and in either direction, and means for operating said clutch mechanisms consisting of a series of rotating cams located in operative relation to the clutch-levers of said clutch mechanisms, said cams being provided with hubs for engagement with a chain or other flexible member, and an operating-lever connected to said chain for shifting the latter, to rotate said cams in either direction at will, substantially as described.

3. In a motor-carriage or other automobile conveyance, a motor, a driving-shaft connected therewith, a driving-axle on said carriage, a counter-shaft supported by said driving-shaft and said axle, and in parallel relation thereto and adjustable in the arc of a circle concentric with said driving-shaft, a positive driving connection between said counter-shaft and axle, a series of clutch mechanisms on said driving-shaft, loose gears thereon in mesh with gears fixed on said counter-shaft, said clutch mechanisms being operated to engage said loose gears for rotating said counter-shaft at varying speeds, and for rotating it in either direction, a series of rotating cams operatively located relative to the clutch-levers of said clutch mechanisms, a flexible medium engaging said cams, and a lever connected to said flexible medium for shifting the latter, substantially as described.

4. In a motor-carriage or other automobile conveyance, a motor therefor adapted to use an explosive element, as gasolene, for a motive force, a driving-shaft connected with said motor, and suitably connected to the driving-axle of said conveyance, a dynamo for generating an electric current for igniting said explosive element in said motor, suitable connections between said dynamo and said motor, and means for rotating the armature of said dynamo, consisting of a suitable driving connection between said driving-shaft and a pulley 66 loose on the armature-shaft 67, a collar 69, secured to said shaft, and oppositely-located arms 68, pivotally supported on said collar, the ends of which arms are held in contact with the hub 66$^a$, of said pulley by a suitable spring 71, whereby, by the rotation of said pulley said shaft is rotated, substantially as described.

5. In a motor-carriage having its front and rear axles rigidly secured to the frame thereof, said front axle having wheels pivotally connected to its extremities for swinging in a horizontal plane, means for swinging said wheels for steering said carriage consisting of the arms 49, secured to the pivoted studs on which said wheels revolve, rods 48, connecting said arms 49 with a forked lever 47, which lever is fixed to a sprocket-wheel 45$^a$, supported in a horizontal plane on said front axle, a sprocket-chain engaging said sprocket-wheel 45$^a$ and a second sprocket-wheel 45, on one end of a steering-post 43$^a$, to the opposite end of which is secured suitable means for rotating said post, substantially as described.

6. In a motor-carriage or other automobile conveyance, a suitable motor, a driving-shaft connected therewith, a counter-shaft, suitable connections between said counter-shaft and the driving-axle of said carriage, and means for driving said counter-shaft at variable rates of speed and in either direction, consisting of a series of loose gears of different diameters on said driving-shaft having flanged pulleys secured to the sides thereof, clutch mechanisms rotating with said driving-shaft for engaging said pulleys, and fixed gears of different diameters secured on said counter-shaft and in mesh with said loose gears, combined with a series of rotating cams for operating said clutch mechanisms, one at a time, during their rotation in one direction only, and a chain engaging with and rotating said cams, and means for moving said chain, substantially as described.

7. In a motor-carriage or other automobile conveyance, a motor, a driving-shaft connected to said motor, a counter-shaft having a suitable connection with the driving-axle of said carriage, a series of loose gears on said driving-shaft and fixed gears on said counter-shaft in mesh with said loose gears, clutch mechanisms on said driving-shaft for engaging said loose gears for rotating said counter-shaft at variable speeds in one direction, and means on said driving-shaft for rotating said counter-shaft in the opposite direction, consisting of an internally-toothed flanged pulley 12, secured to the side of one of said loose pulleys, as 7, a friction-driven pulley 14, a gear 13 on the hub thereof, a yoke 15, having pinions 16 thereon, said yoke having a bearing on the said hub of pulley 14, a clutch mechanism for engaging and rotating said pulley 14, a cam-operated clutch-lever for operating said clutch mechanism, and means actuated by said clutch-lever for engaging the said yoke 15 and preventing the rotation thereof during the rotation of said pulley 14, combined with means for operating said cams, substantially as described.

JAMES FRANK DURYEA.

Witnesses:
WM. H. CHAPIN,
K. I. CLEMONS.